US009124421B2

(12) United States Patent
Zhao et al.

(10) Patent No.: US 9,124,421 B2
(45) Date of Patent: Sep. 1, 2015

(54) DATA PRIORITIZATION, STORAGE AND PROTECTION IN A VEHICULAR COMMUNICATION SYSTEM

(71) Applicant: Intel Corporation, Santa Clara, CA (US)

(72) Inventors: Meiyuan Zhao, Santa Clara, CA (US); Christian Maciocco, Portland, OR (US); Shilpa Talwar, Los Altos, CA (US); Jessie Walker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/096,386

(22) Filed: Dec. 4, 2013

(65) Prior Publication Data

US 2015/0156013 A1   Jun. 4, 2015

(51) Int. Cl.
*H04L 29/00* (2006.01)
*H04L 9/08* (2006.01)
*H04W 12/04* (2009.01)
*H04L 29/08* (2006.01)

(52) U.S. Cl.
CPC .............. *H04L 9/0819* (2013.01); *H04L 67/12* (2013.01); *H04W 12/04* (2013.01); *H04L 2209/80* (2013.01); *H04L 2209/84* (2013.01)

(58) Field of Classification Search
USPC ....................................................... 380/270
See application file for complete search history.

(56) References Cited

U.S. PATENT DOCUMENTS

2013/0204466 A1*   8/2013   Ricci ................................. 701/2

OTHER PUBLICATIONS

Zhao et al, "Security Challenges for the Intelligent Transportation System", First International Conference on Internet of Things (SECURIT) Aug. 2012.

* cited by examiner

*Primary Examiner* — Brandon Hoffman
*Assistant Examiner* — Michael D Anderson
(74) *Attorney, Agent, or Firm* — Grossman, Tucker, Perreault & Pfleger, PLLC (57) ABSTRACT

This disclosure is directed to data prioritization, storage and protection in a vehicular communication system. A black box (BB) in a vehicle may receive data from an on-board unit (OBU) and a vehicular control architecture (VCA). The OBU may interact with at least one RSU that is part of an intelligent transportation system (ITS) via at least two channels, at least one of the at least two channels being reserved for high priority messages. The OBU may transmit ITS data to the BB via a secure communication channel, which may be stored along with vehicular data received from the VCA in encrypted form. In response to a request for data, the BB may authenticate a requesting party, determine at least part of the stored data to which the authenticated party is allowed and sign the at least part of the stored data before providing it to the authenticated party.

19 Claims, 5 Drawing Sheets

DATA PRIORITIZATION, STORAGE AND PROTECTION IN A VEHICULAR COMMUNICATION SYSTEM

TECHNICAL FIELD

The present disclosure relates to data handling, and more particularly, to a system for prioritizing, storing and protecting data generated by a vehicular communication system.

BACKGROUND

The rapid evolution of electronic communication technology is causing interaction via electronic communication to become a staple of modern life. Not only are new communication devices constantly being released (e.g., such as smart phones, tablet computers, worn computing devices, etc.), but also the ability to interact electronically is now being integrated into a variety of existing applications that did not previously include such functionality. For example, wireless communication in vehicles such as automobiles is now being envisioned to help facilitate traffic management, accident avoidance, etc. At least one embodiment of a vehicular communication system has been standardized in IEEE 802.11p, which is an approved amendment to the IEEE 802 wireless standard describing wireless access in vehicular environments (WAVE). WAVE standardizes communications within an intelligent transportation system (ITS) that may include data exchanges between vehicles moving at high-speeds, between vehicles and a fixed control infrastructure including, for example, at least one wireless road-side unit (RSU), etc. Currently, the 5.9 GHz band (e.g., 5.85-5.925 GHz) is reserved to support all ITS wireless operation.

However, the implementation of an ITS is not without some challenges. In practice, cars may need to transmit messages constantly at many times per second in order to apprise other cars of location, to report status to the ITS management infrastructure, etc. This requirement may be magnified exponentially in dense metropolitan areas, on major thoroughfares, during rush hour, etc. As a result, the ITS as currently envisioned may not be able to handle this communication burden, especially with respect to exceptional situations such as accidents, weather emergencies, traffic tie-ups, etc. Moreover, any ITS system may not be foolproof. Accidents may still occur, and data for determining how an accident may have occurred and for use in preventing further incidents may not be readily available in a system handling millions of data transactions daily.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to data prioritization, storage and protection in a vehicular communication system. In general, a black box (BB) in a vehicle may receive data from at least an on-board unit (OBU) and a vehicular control architecture (VCA) in the vehicle, the data being stored in a secure manner by the BB. The OBU may, for example, interact with at least one of a RSU that is part of an ITS or another vehicle. In one embodiment, the OBU may communicate with the at least one of the RSU or other vehicle via at least two channels, at least one of the at least two channels being reserved for high priority messages. The OBU may transmit ITS data (e.g., received and transmitted messages) to the BB via a secure communication channel. The BB may store the ITS data and vehicular data (e.g., received from the VCA) in protected form (e.g., that satisfies a requirement to keep the data secret). Various parties may request to access the protected ITS and vehicular data stored in the BB. In one embodiment, the BB may initially authenticate the requesting party prior to determining at least part of the stored data to which the authenticated party is allowed. The BB may then sign the at least part of the stored data before providing it to the authenticated party (e.g., to establish that the data is authentic, unaltered, etc.) and/or may employ additional protocols to ensure the data satisfies integrity, authenticity and/or confidentiality requirements.

In one embodiment, a device for use in a vehicular communication system may comprise, for example, a communication module, a key storage module, a crypto module and a secure storage module. The communication module may be to at least receive vehicular data from a VCA in a vehicle in which the device is situated, and to receive ITS data from an OBU also situated in the vehicle. The key storage module may be to store at least one key for at least one of data encryption, data decryption or data signing. The crypto module may be to utilize the at least one key for at least one of data encryption or decryption. The secure storage module may be to store encrypted vehicular data received from the VCA and encrypted ITS data received from the OBU via the communication module, the vehicular and ITS data being encrypted by the crypto module utilizing the at least one key stored in the key storage module.

The OBU may be to, for example, interact with at least one of a road side unit (RSU) in the ITS or another vehicle, the interaction including at least one of receiving messages from, or transmitting messages to, the at least one of the RSU or other vehicle. In this implementation, the ITS data comprises at least any messages received from the at least one of the RSU or other vehicle and any transmitted messages transmitted to the at least one of the RSU or other vehicle. The OBU may be to interact with the at least one of the RSU or other vehicle on at least two channels, at least one of the at least two channels being reserved for high priority messages. The OBU may then be to process messages received or transmitted via the high priority message channel before other messages pending for processing in the OBU.

In the same or another embodiment, the key storage module, crypto module and secure storage module may be protected within a trusted execution environment (TEE) in the device. At least the encrypted ITS data may be received, for example, via a secure communication channel established between the communication module and the OBU. In an example of operation, at least the secure storage module may be to receive a request for the encrypted vehicular and ITS data from a requesting party via the communication module. At least the crypto module may then be to authenticate the requesting party based at least on one root of trust in the key storage module. At least the secure storage module may then be to determine at least part of the encrypted vehicular and ITS data that the requesting party is allowed to receive based at least on at least one policy associated with the authenticated requesting party. At least the crypto module may then be to decrypt the at least part of the encrypted vehicular and ITS data using the at least one key, to sign the at least part of the decrypted vehicular and ITS data using the at least one key and to provide the signed part of the vehicular and ITS data to the requesting party. An example method for protecting data in a vehicular communication system consistent with the present disclosure may comprise receiving vehicular data in a device from a vehicular control architecture (VCA) in a vehicle in which the device is situated, receiving intelligent transportation system (ITS) data from an on-board unit (OBU) also situated in the vehicle, storing at least one key for at least one of data encryption, data decryption or data signing, encrypting the vehicular data received from the VCA and the ITS data received from the OBU utilizing the at least one key and storing the encrypted vehicular and ITS data.

Figure 1:
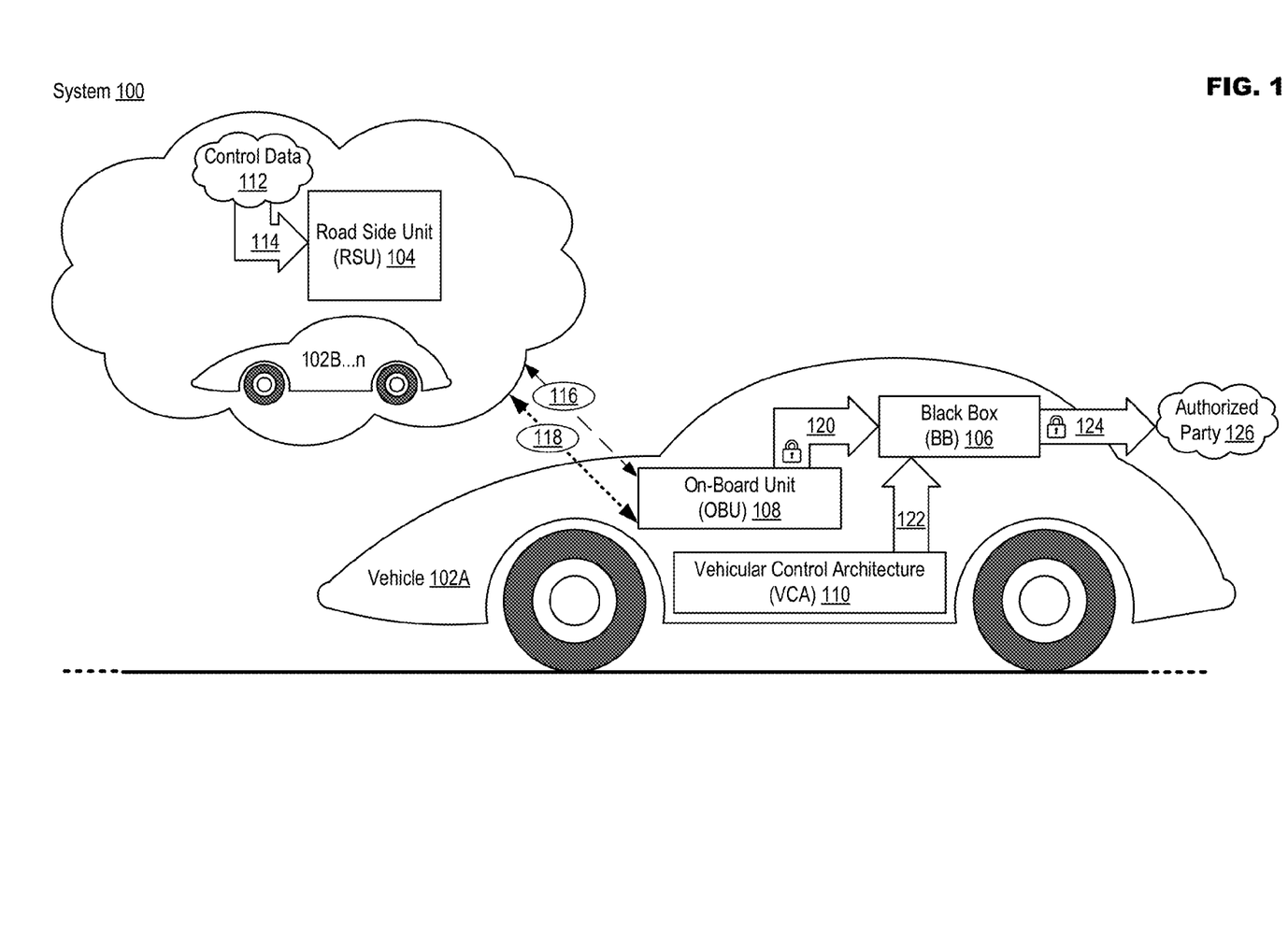
FIG. 1 illustrates an example of data prioritization, storage and protection in a vehicular communication system accordance with at least one embodiment of the present disclosure.

FIG. 1 illustrates an example of data prioritization, storage and protection in a vehicular communication system accordance with at least one embodiment of the present disclosure. System 100 may comprise at least one vehicle such as, for example, vehicle 102A, vehicle 102B to vehicle 102n (collectively, "vehicles 102A . . . n") and at least one RSU 104. For the sake of explanation herein, vehicles 102A . . . n may be described as road-going transportation (e.g., motorcycle, car, truck, bus etc.). However, vehicles 102A . . . n may be another type of vehicle such as, but not limited to, a rail-going vehicle, aquatic vehicle, aircraft, tracked vehicle, etc. RSU 104 may be a device capable of wired and/or wireless communication that allows RSU 104 to both receive messages from vehicles 102A . . . n (e.g., in regard to position, speed, status, etc.) and transmit messages to vehicles 102A . . . n (e.g., in regard to traffic conditions, accidents, emergencies, road status, etc.). In one embodiment, RSU 104 may be a part of an ITS comprising a plurality of RSUs 104 situated at various locations within a transportation system. The ITS may comprise at least one computing device accessible to RSU 104 via, for example, a wired and/or wireless connection to a local-area network (LAN), a wide-area network (WAN) like the Internet, a global-area network (GAN), etc. In one example implementation, the ITS may comprise a plurality of data servers organized in a cloud-computing configuration. The data collected by RSU 104 may be employed to manage vehicular traffic levels, respond to accidents, communicate instructions to vehicles in emergency situations (e.g., weather related hazards, major accidents, etc.), etc.

In the example of FIG. 1, the configuration of vehicle 102A is provided as an example of a configuration that may also be applicable to other vehicles 102B . . . n (e.g., other vehicles that are operating in the ITS). Vehicle 102A may comprise, for example, at least BB 106, OBU 108 and VCA 110. BB 106 may receive ITS data from OBU 108 (e.g., comprising messages sent to other vehicles 102B . . . n or RSU 104, or messages received from other vehicles 102B . . . n or RSU 104) and vehicular data 116 from VCA 110 (e.g., comprising data concerning the operation of vehicle 102A, operations initiated by an operator of vehicle 102A, etc.). An example of operation in regard to the embodiment disclosed in FIG. 1 will now be explained. It is important to note that while only RSU 104 is shown in communication with OBU 108, it may also be possible for OBU 108 to communicate with other vehicles 102B . . . n (e.g., other vehicles within communication range of vehicle 102A). RSU 104 may receive control data 112 (e.g., from an ITS) as shown at 114. Control data 112 may comprise, for example, notifications, warnings, instructions, etc. to convey to vehicle 102A in the form of messages, or alternatively, control data 112 may comprise raw data, control signals, etc. that RSU 104 may utilize to generate the above types of messages.

In practice, RSU 104 and/or OBU 108 may need to transmit many messages per second to continually inform RSU 104 and/or other vehicles 102B . . . n of the position, speed, travel direction, condition, etc. of vehicle 102A, to inform OBU 108 of the position of other vehicles 102B . . . n, traffic conditions, road hazards, emergencies, etc. It then is foreseeable that message backlog may become an issue when this amount of communication is multiplied by a plethora of active RSUs 104 and vehicles 102A . . . n on the road, especially in large metropolitan areas. A backlog of messages may mean that important information is not processed by OBU 108 in time to avoid a calamity. In one embodiment, RSU 104 and/or other vehicles 102B . . . n may interact with OBU 108 in vehicle 102A via at least two channels 116 and 118. For example, channel 116 (e.g., 700 MHz) may be reserved for high priority messages pertaining to accidents, emergencies, etc., while channel 118 (e.g., 5.9 GHz) may be reserved for normal messages (e.g., any message that is not high priority). This type of channel organization may be employed to ensure that high priority messages are received and processed in a timely manner by OBU 108. In particular, the message traffic on channel 116 may be substantially lower than channel 118 since it is limited to high priority messages. Messages received via channel 116 may be prioritized for processing above messages received via channel 118, and thus, may be handled in an expeditious manner.

Messages received and transmitted via channels 116 or 118 may be processed and stored, at least temporarily, by OBU 108. Theses messages may then be provided to BB 106 as shown at 120. In one embodiment, OBU 108 and BB 106 may interact via a secure communication channel (e.g., encrypted based on the Advanced Encryption Standard (AES), RSA encryption, Sign-and-Mac (SIGMA) encryption, etc.). Using a secure communication channel may help to ensure that the ITS data received from OBU 108 is authentic and un-altered. In addition to the ITS data, vehicular data may be provided to BB 106 as shown at 122. BB 106 may proceed to then store the ITS data and vehicular data in a protected manner. For example, the data may be encrypted using a key also stored in BB 106. An example implementation that protects stored data and at least part of BB 106 in a trusted execution environment (TEE) is disclosed in FIG. 4.

Situations may exist where a party may desire to access data stored within BB 106. For example, following an accident, an emergency, a malfunction in the ITS, etc., parties such as an insurance provider, an emergency services provider, law enforcement or another governmental entity, etc. may desire to obtain data stored within BB 106 to determine what occurred (e.g., did an ITS system error occur?, did vehicle 102A malfunction?, was operator error involved?, etc.). However, a vehicle owner/operator may desire to control how data is obtained from BB 106. In one embodiment, parties seeking to obtain data from BB 106 may first be authenticated by BB 106. For example, an authorized handshake protocol may be employed to ensure that BB 106 is a legitimate BB 106, has not been tampered with, and also that the requestor is an authorized party 126. Key credentials for authorized parties may be established, for example, during vehicle manufacture (e.g., for insurance providers, national entities, etc.), at vehicle registration (e.g., for local law enforcement, emergency providers, etc.), at any time by the operator of the vehicle, etc. For example, BB 106 may securely store a root key of trust for any authorized party 126 that has established a trust relationship with the BB 106. Protection of the root keys of trust is important such that no malicious party could insert their own root keys into the secure storage.

BB 106 may determine at least part of the data that authorized party 126 is allowed to receive (e.g., based on at least one policy established in BB 106). An example policy may dictate that national investigative entities like law enforcement may be entitled to full data access, while the same or a different policy dictates that insurance providers may be entitled to only certain ITS data and/or vehicular data (e.g., average speed, turn signal usage, etc. at certain times without location information) as may be determined by the user (e.g., permissions for receiving data may be established at similar instances as listed above for the key credentials). After BB 106 determines the part of the stored ITS and/or vehicular data that authorized party 126 is permitted to access, BB 106 may further decrypt and provide the part of the data to authorized party 126 as shown at 124. The interaction between BB 106 and authorized party 126 may be via wired or wireless communication and may be secured to prevent unauthorized parties from intercepting and/or altering the information (e.g., as in the instance of a man-in-the-middle attack). Moreover, in one embodiment the part of the data provided to authorized party 126 may be signed by BB 106 using at least one private key stored in BB 106. Signing the data may help to ensure that the origin of the data may be readily verified, as well as that the data is in its original form (e.g., authentic, unaltered, etc.). The part of the data may also be conveyed via a secure protocol to the authorized party to ensure that the part of the data remains confidential.

Figure 2:
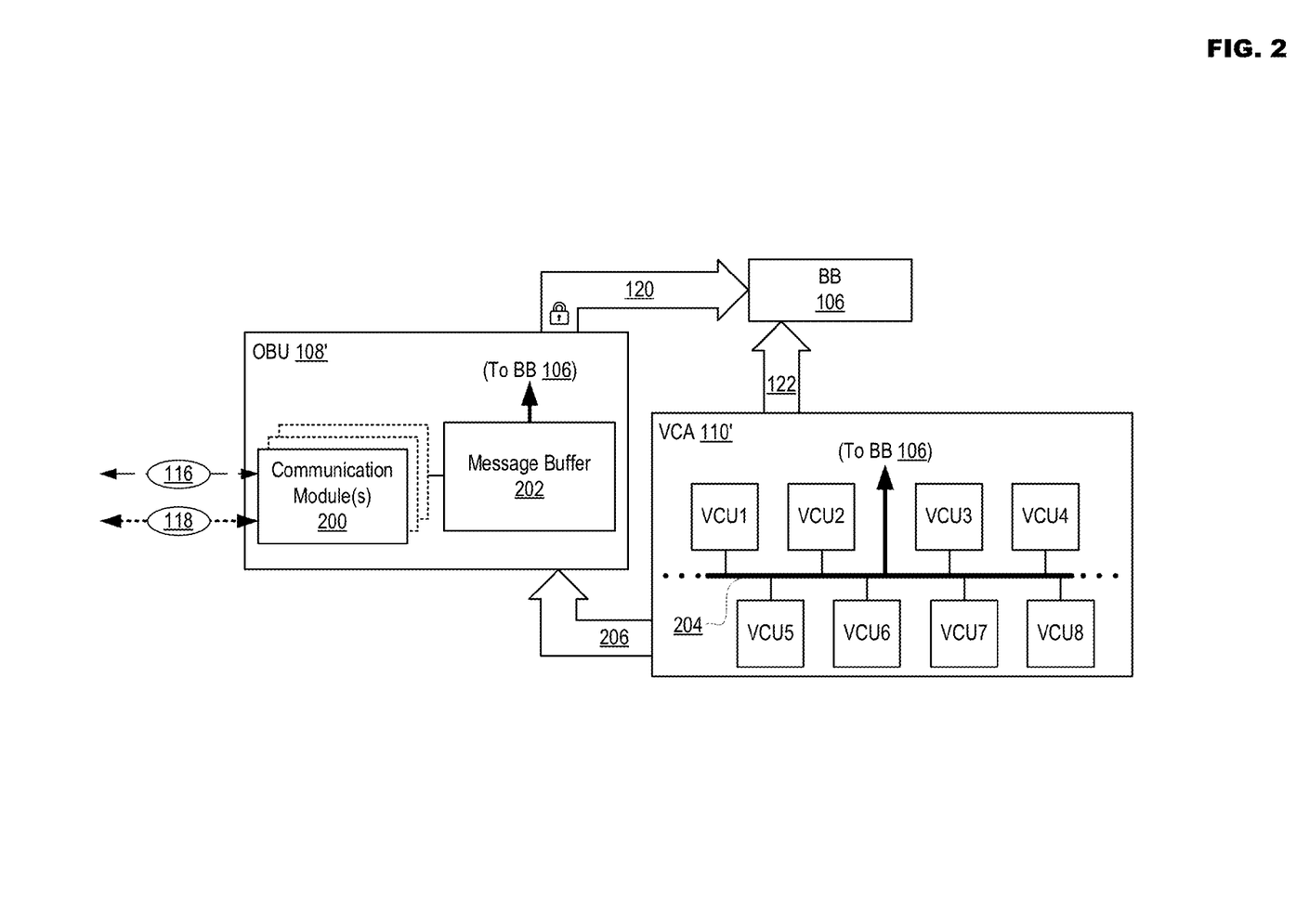
FIG. 2 illustrates an example configuration for an on-board unit (OBU) and a vehicular control architecture (VCA) in accordance with at least one embodiment of the present disclosure.

FIG. 2 illustrates an example configuration for an OBU and a VCA in accordance with at least one embodiment of the present disclosure. OBU 108' may comprise, for example, at least one communication module 200 and message buffer 202. The actual number of communication modules 200 may depend on the particular implementation, the type technology being employed for communication channels 116 and 118, etc. For example, in one embodiment communication module 200 may receive and/or transmit messages on at least communication channels 116 and 118. Alternatively, separate communication modules 200 in OBU 108' may each be responsible for handling messages on different communication channels. Regardless of the communication configuration in OBU 108', message buffer 202 may store, at least temporarily, ITS data (e.g., messages received by, or transmitted from, at least one communication module 200). Message buffer 202 may then provide the ITS data to BB 106 via a secure communication channel as shown at 120. The ITS data may be provided to BB 106 on a real-time basis (e.g., as received by OBU 108' or transmitted from OBU 108'), a periodic basis, on an event-driven basis, etc. For example, the transmission of data out of OBU 108 may be driven by a request to access protected data from protected storage within BB 106 received from authorized party 126.

VCA 110' may comprise at least one vehicle control unit (VCU) to control operations in vehicle 102A. In practice, vehicles such as automobiles may comprise a plurality of controllers such as, but not limited to, VCU1, VCU2, VCU3, VCU4, VCU5, VCU6, VCU7 and VCU8 (collectively "VCU1 . . . 8") for controlling different aspects of vehicular operation. VCU1 . . . 8 may be coupled by bus 204 such as a controller area network (CAN) bus, an optical mesh bus architecture, etc. While eight (8) controllers VCU1 . . . 8 are illustrated in FIG. 2, the actual number of controllers may vary depending on the particular implementation. Individual controllers may be employed to control, for example, engine operation, drivetrain shifting, suspension adjustment, heating, ventilating and air conditioning (HVAC) operation, driver interface operation, entertainment and/or navigation systems, security, vehicle condition monitoring and warning systems, etc. These controllers may also store information regarding vehicular operation. For example, controllers may store vehicle location, speed, acceleration, suspension changes (e.g., when vehicle 102A is cornering, G-force and/or body angle during cornering, etc.), user actions (e.g., turn signal operation, radio operation, communication system operation, etc.), etc. In more advanced vehicles 102, the operator of vehicle 102A may also be determined by a controller in VCA 110'. For example, an operator may be identified by electronics in the key used to start vehicle 102A, by codes keyed into a user interface to deactivate security in vehicle 102A, by biometric identification (e.g., by voice identification, fingerprint identification, facial recognition, etc.). A controller in VCA 110' may also be able to operate cameras inside or outside of vehicle 102A to record operator/passenger activities and/or activities occurring outside of vehicle 102A. At least one controller in VCA 110' may be configured to provide vehicular data, including some or all of the types of data set forth above, to BB 106 as shown at 122. In one embodiment, vehicular data may also be provided to OBU 108' as shown at 206. OBU 108' may employ the vehicular data provided at 206 when generating messages to inform other vehicles 102B . . . n and/or RSU 104 about, for example, vehicular speed, direction, location, breakdowns, accidents, etc. Vehicular data may be provided on a real-time basis (e.g., as recorded by VCA 110'), a periodic basis, on an event-driven basis, etc. While the example of FIG. 2 illustrates the vehicular data being provided via an unsecured communication channel, communication 122 and/or 206 may be secured in a manner similar to communication 120 to, for example, help to establish that the vehicular data is authentic, has not been altered, etc.

Figure 3:
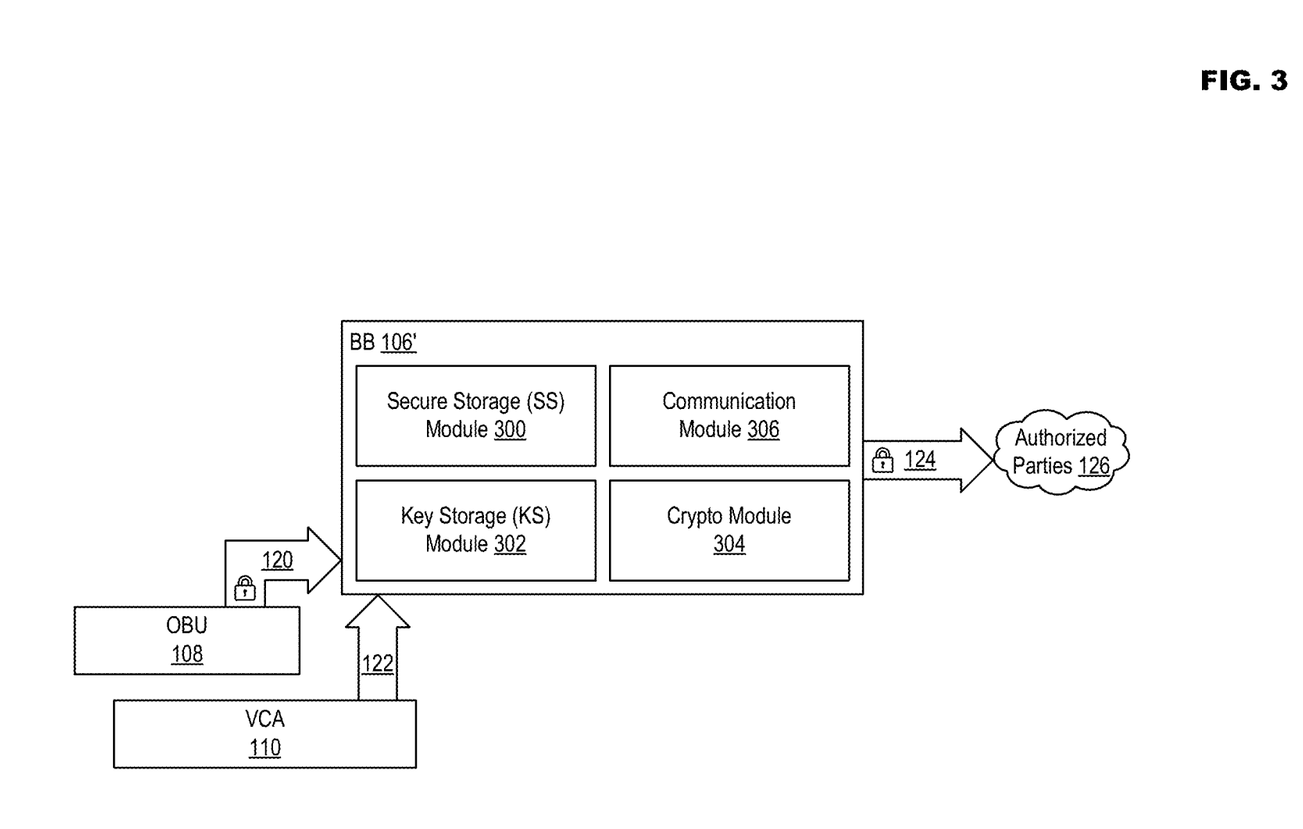
FIG. 3 illustrates an example configuration for a black box in accordance with at least one embodiment of the present disclosure.

FIG. 3 illustrates an example configuration for a BB in accordance with at least one embodiment of the present disclosure. BB 106' may comprise, for example, at least secure storage (SS) module 300, key storage (KS) module 302, crypto module 304 and communication module 306. SS module 300 may be to store incoming data (e.g., ITS data and vehicular data) in a secure manner. For example, SS module 300 may encrypt the incoming data using at least one key stored in KS module 302. In one embodiment, SS module 300 may orchestrate requests for stored data received from various parties. SS module may by itself, or in conjunction with KS module 302 and/or crypto module 304, authenticate requesting parties and/or may determine the stored ITS and/or vehicular data that an authenticated party is allowed to receive. KS module 302 may be to store at least one key for use in data encryption or decryption, at least one key and authorized root key sets for authentication, signing, etc. For example, KS module 302 may store at least one key, or alternatively separate public and private keys, for establishing a secure communication channel with at least OBU 108, for encrypting data to be stored in SS module 300, for performing an authorized handshake protocol with requesting parties, for signing data for authorized parties, etc. In an example implementation, KS module 302 may store at least one private key associated with a public key in OBU 108 that may be utilized by an authorized party to certify OBU 108 as legitimate and situated in an authorized vehicle. The at least one private key may be further employed by crypto module 304 to, for example, sign data to ensure origin authenticity.

Crypto module 304 may be an engine for encryption, decryption, keyed hash, random number generation, authentication, authorization, etc. in BB 106'. For example, crypto module 304 may decrypt at least ITS data received from OBU 108 and may encrypt the received ITS and vehicular data prior to storage in SS module 300. In one embodiment, crypto engine 304 may also participate in authenticating parties requesting data from SS module 300 (e.g., through an authorized handshake protocol) and/or may sign the part of the stored data that is provided to an authenticated party. Communication module 306 may, via wired and/or wireless communication, facilitate interaction between BB 106' and at least OBU 108 and VCA 110. In one embodiment, communication module 306 may also facilitate interaction between BB 106' and parties requesting access to data stored in BB 106'. Crypto module 304 may also be capable of deriving or generating keys using keyed hash and/or random number generation as required by authentication and authorization protocols.

Figure 4:
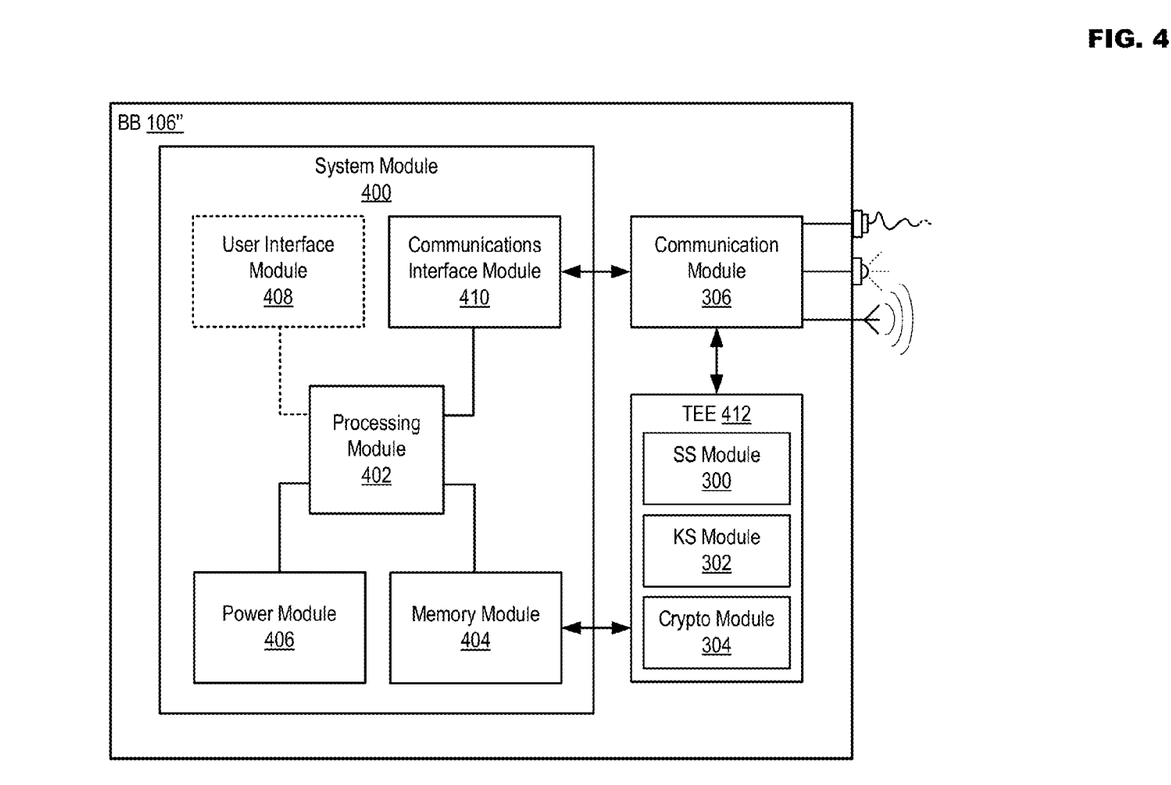
FIG. 4 illustrates an example implementation for a black box in accordance with at least one embodiment of the present disclosure.

FIG. 4 illustrates an example implementation for a BB in accordance with at least one embodiment of the present disclosure. In particular, BB 106" may be able to perform example functionality such as disclosed in FIG. 3. However, BB 106" is meant only as an example of equipment usable in embodiments consistent with the present disclosure, and is not meant to limit these various embodiments to any particular manner of implementation.

BB 106" may comprise system module 400 configured to manage device operations. System module 400 may include, for example, processing module 402, memory module 404, power module 406, user interface module 408 and communication interface module 410. BB 106" may further comprise communication module 306 and TEE 412. While communication module 306 and TEE 412 have been illustrated separately from system module 400, the example implementation of BB 106" has been provided merely for the sake of explanation herein. Some or all of the functionality associated with communication module 306 and/or TEE 412 may also be incorporated within system module 400.

In BB 106", processing module 402 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 402 may interact with other system components that may be operating at different speeds, on different buses, etc. in BB 106". Some or all of the functionality commonly associated with the support circuitry may also be included in the same physical package as the processor (e.g., such as in the Sandy Bridge family of processors available from the Intel Corporation).

Processing module 402 may be configured to execute various instructions in BB 106". Instructions may include program code configured to cause processing module 402 to perform activities related to reading data, writing data, processing data, formulating data, converting data, transforming data, etc. Information (e.g., instructions, data, etc.) may be stored in memory module 404. Memory module 404 may comprise random access memory (RAM) and/or read-only memory (ROM) in a fixed or removable format. RAM may include memory to hold information during the operation of BB 106" such as, for example, static RAM (SRAM) or dynamic RAM (DRAM). ROM may comprise memories utilizing a Basic Input/output System (BIOS) or Unified Extensible Firmware Interface (UEFI) for performing boot operations, programmable memories such as, for example, electronic programmable ROMs (EPROMS), Flash, etc. Memory module 402 may also comprise magnetic memories including, for example, floppy disks, fixed/removable hard drives, etc., electronic memories including, for example, solid state flash memory (e.g., embedded multimedia card (eMMC), etc.), removable cards/sticks (e.g., micro storage devices (uSD), USB, etc.), optical memories including, for example, compact disc ROM (CD-ROM), digital video disc (DVD), etc.

Power module 406 may include internal power sources (e.g., a battery, internal fuel cell, etc.) and/or external power sources (e.g., electromechanical or solar generator, power grid, fuel cell, etc.), and related circuitry configured to supply BB 106" with the power needed to operate. User interface module 408 may be optional (e.g., may be omitted in entirety from system module 400) based on the particular implementation of BB 106". For example, BB 106" may not include its own user interface module 408 and may instead rely upon another device such as, for example, an entertainment/navigation interface in vehicle 102A, a user interface in an external device, etc. for the functionality provided by user interface module 408. User interface module 408 may comprise equipment and/or software to allow users to interact with BB 106" such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The equipment in user interface module 408 may be incorporated within BB 106" and/or may be coupled to BB 106" via a wired or wireless communication medium.

Communication interface module 410 may be configured to manage packet routing and other control functions for communication module 306, which may include resources configured to support wired and/or wireless communications. In some instances, BB 106" may comprise more than one communication module 306 (e.g., including separate physical interface modules for wired protocols and/or wireless radios) all managed by a centralized communication interface module 410. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or communication via sound waves. In one embodiment, communication interface module 410 may be configured to prevent wireless communications that are active in communication module 306 from interfering with each other. In performing this function, communication interface module 410 may schedule activities for communication module 306 based on, for example, the relative priority of messages awaiting transmission. While the embodiment disclosed in FIG. 4 illustrates communication interface module 410 being separate from communication module 306, it may also be possible for the functionality of communication interface module 410 and communication module 306 to be incorporated within the same module.

In the example implementation illustrated in FIG. 4, at least one of SS module 300, KS module 302 or crypto module 300 may be encompassed within trusted execution environment (TEE) 412. TEE 412 may be a secure workspace in which known-good programs may execute, confidential information may be stored in a secure manner, etc. While protected within TEE 412, modules 300-304 may continue to interact with, for example, memory module 404 (e.g., to store data in a secure manner, to retrieve stored data, etc.) and/or communication module 306 (e.g., to interact with at least one of OBU 108, VCA 110 or authorized parties 126). TEE 412 may utilize, for example, Software Guard Extensions (SGX) technology developed by the Intel Corporation. SGX may create a safe and hardware-encrypted computation and storage area in memory module 404, the contents of which cannot be deciphered by privileged code or even through the application of hardware probes to a memory bus. When TEE 412 is protected by SGX, embodiments consistent with the present disclosure make it impossible for an intruder to decipher the contents of TEE 412.

In an example implementation wherein TEE 412 is protected by SGX, the identity of programs (e.g., based on a cryptographic hash measurement of each program's contents) may be signed and stored inside each program. When the programs are then loaded, the processor may verify that the measurement of the program (e.g., as computed by the processor) is identical to the measurement previously embedded inside the program. The signature used to sign the embedded measurement is also verifiable because the processor is provided with a public key used to verify the signature at program load time. This way malware can't tamper with the program without also altering its verifiable measurement. Malware also cannot spoof the signature because the signing key is secure with the program's author. Thus, the software may not be read, written to or altered by any malware. Moreover, data may also be protected in TEE 412. For example, known-good programs in TEE 412 may encrypt data such as keys, passwords, licenses, etc. so that only verified good programs may decrypt this information. While only one TEE 412 is disclosed in BB 106″, it is also possible for a plurality of TEEs 108 to exist. The use of a plurality of TEEs 108 may increase security in BB 106″ in that if one TEE 412 is compromised the security of the remaining separate TEEs 108 remains intact.

Figure 5:
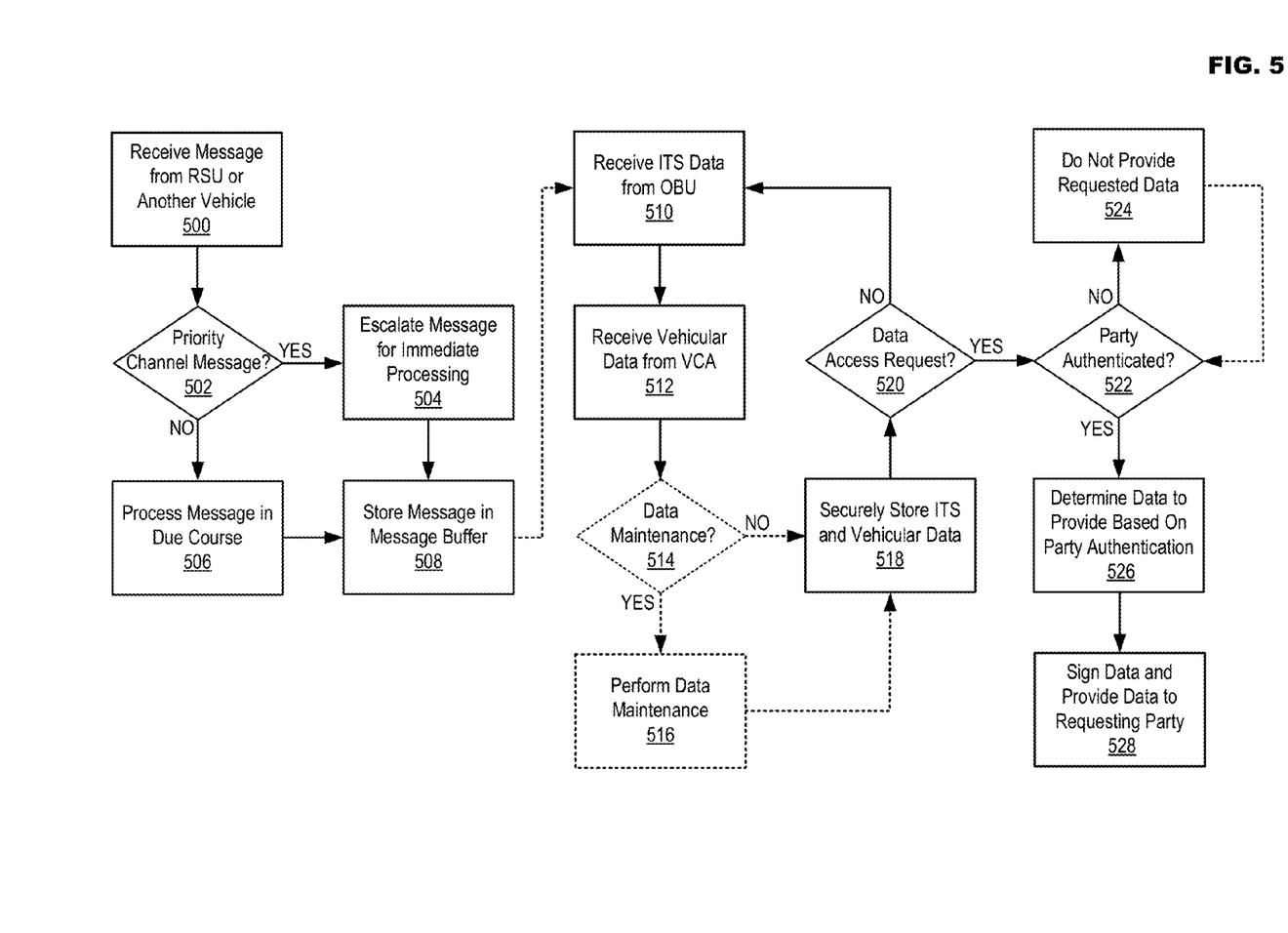
FIG. 5 illustrates example operations for data prioritization, storage and protection in a vehicular communication system in accordance with at least one embodiment of the present disclosure.

FIG. 5 illustrates example operations for data prioritization, storage and protection in a vehicular communication system in accordance with at least one embodiment of the present disclosure. Operations 500 to 508 may be performed by, for example, an OBU in a vehicle. In operation 500 a message may be received from an RSU or another vehicle. A determination may then be made in operation 502 as to whether the message was received via a priority channel. If in operation 502 it is determined that the message was received via a priority channel, then the message may be escalated for immediate processing by the OBU. If in operation 502 it is determined that the message was not received via the priority channel (e.g., the message was received via a "normal" channel), then in operation 506 the message may be processed in due course (e.g., the message may be queued for processing after any high priority messages and any previously received normal priority messages awaiting processing). Following operations 504 or 506, the message may then be stored in a message buffer in operation 508.

Operations 510 to 528 may be performed by, for example, a BB in the same vehicle as the above OBU. Received messages stored in operation 508, along with messages transmitted by the OBU, may be received as ITS data by the BB in operation 510. The BB may further receive vehicular data from a VCA in the same vehicle in operation 512. Operations 514 to 516 may be optional in that some implementations may simply perform first-in-first-out (FIFO) message handling, and thus, the messages received in operations 510 to 512 may simply push the oldest stored messages out of storage. In operation 514 a determination may be made as to whether data maintenance is required to make room for the newly received data. If in operation 514 it is determined that data maintenance is required, then in operation 516 data maintenance may be performed. Data maintenance may include, for example, archiving older data, deleting older data, etc. Following a determination in operation 514 that data maintenance is not required, or alternatively following operation 516, the ITS and vehicular data received in operations 510 and 512 may be securely stored (e.g., encrypted and stored) in operation 518. A determination may then be made in operation 520 as to whether a data access request has been received in the BB. A determination in operation 520 that a data access request has not been received may be followed by a return to operation 510 to prepare for the next receipt of data from the OBU.

If in operation 520 it is determined that a data access request has been received, then in operation 522 a determination may be made as to whether the party requesting the data can be authenticated. Authentication may be based on, for example, an authorized handshake protocol. If it is determined in operation 524 that the requesting party cannot be authenticated, then in operation 524 the data may not be provided to the requesting party, which may optionally be followed by a return to operation 522 to reattempt authentication. If the requesting party is authenticated in operation 522 (e.g., transforming the requesting party into an authenticated party), then in operation 526 a determination may be made as to the data that the authenticated party is allowed to access. For example, some authenticated parties may be allowed to access all of the stored ITS and vehicular data, while some authenticated parties may be allowed to access only part of the data. The part of the data that the authenticated party is allowed to access may then be signed (e.g., to allow the origin to be determined, to ensure that the data is authentic, has not been modified, etc.), and may then be provided to the authenticated party in operation 528.

While FIG. 5 illustrates operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to data prioritization, storage and protection in a vehicular communication system. A black box (BB) in a vehicle may receive data from an on-board unit (OBU) and a vehicular control architecture (VCA). The OBU may interact with at least one RSU that is part of an intelligent transportation system (ITS) via at least two channels, at least one of the at least two channels being reserved for high priority messages. The OBU may transmit ITS data to the BB via a secure communication channel, which may be stored along with vehicular data received from the VCA in encrypted form. In response to a request for data, the BB may authenticate a requesting party, determine at least part of the stored data to which the authenticated party is allowed and sign the at least part of the stored data before providing it to the authenticated party.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for data prioritization, storage and protection in a vehicular communication system, as provided below.

According to example 1 there is provided a device for use in a vehicular communication system. The device may comprise a communication module to at least receive vehicular data from a vehicular control architecture (VCA) in a vehicle in which the device is situated, and to receive intelligent transportation system (ITS) data from an on-board unit (OBU) also situated in the vehicle, a key storage module to store at least one key for at least one of data encryption, data decryption or data signing, a crypto module to utilize the at least one key for at least one of data encryption, data decryption or data signing and a secure storage module to store encrypted vehicular data received from the VCA and encrypted ITS data received from the OBU via the communication module, the vehicular and ITS data being encrypted by the crypto module utilizing the at least one key stored in the key storage module.

Example 2 may include the elements of example 1, wherein the OBU is to interact with at least one of a road side unit (RSU) in the ITS or another vehicle, the interaction including at least one of receiving messages from, or transmitting messages to, the at least one of the RSU or other vehicle.

Example 3 may include the elements of example 2, wherein the ITS comprises a plurality of RSUs distributed throughout the ITS.

Example 4 may include the elements of any of examples 2 to 3, wherein the ITS data comprises at least any messages received from the at least one of the RSU or other vehicle and any transmitted messages transmitted to the at least one of the RSU or other vehicle.

Example 5 may include the elements of example 4, wherein the messages transmitted to the at least one of the RSU or other vehicle pertain to at least one of speed, direction, location or condition of the vehicle.

Example 6 may include the elements of example 2, wherein the OBU is to interact with the at least one of the RSU or other vehicle on at least two channels, at least one of the at least two channels being reserved for high priority messages.

Example 7 may include the elements of example 6, wherein at least one of the at least two channels operates at 5.9 GHz.

Example 8 may include the elements of any of examples 6 to 7, wherein the channel reserved for high priority messages operates at 700 MHz.

Example 9 may include the elements of any of examples 6 to 7, wherein the OBU is to process messages received or transmitted via the high priority message channel before other messages pending for processing in the OBU.

Example 10 may include the elements of example 9, wherein the messages received or transmitted via the high priority message channel pertain to at least one of emergency notifications or accident notifications.

Example 11 may include the elements of any of examples 6 to 7, wherein the OBU is to interact with the at least one of the RSU or other vehicle on at least two channels, at least one of the at least two channels being reserved for high priority messages and process messages received or transmitted via the high priority message channel before other messages pending for processing in the OBU.

Example 12 may include the elements of example 1, wherein at least the key storage module, crypto module and secure storage module are protected within a trusted execution environment (TEE) in the device.

Example 13 may include the elements of example 1, wherein at least the encrypted ITS data is received via a secure communication channel established between the communication module and the OBU.

Example 14 may include the elements of example 1, wherein at least the secure storage module is to receive a request for the encrypted vehicular and ITS data from a requesting party via the communication module.

Example 15 may include the elements of example 14, wherein at least the crypto module is to authenticate the requesting party based at least on one root of trust in the key storage module.

Example 16 may include the elements of example 15, wherein at least the secure storage module is to determine at least part of the encrypted vehicular and ITS data that the requesting party is allowed to receive based at least on at least one policy associated with the authenticated requesting party.

Example 17 may include the elements of example 16, wherein at least the crypto module is to decrypt the at least part of the encrypted vehicular and ITS data using the at least one key, to sign the at least part of the decrypted vehicular and ITS data using the at least one key and to provide the signed part of the vehicular and ITS data to the requesting party.

Example 18 may include the elements of example 17, wherein at least the crypto module is further to provide the signed part of the vehicular and ITS data to the requesting party via a secure communication channel to maintain the confidentiality of the vehicular and ITS data.

According to example 19 there is provided a method for protecting data in a vehicular communication system. The method may comprise receiving vehicular data in a device from a vehicular control architecture (VCA) in a vehicle in which the device is situated, receiving intelligent transportation system (ITS) data from an on-board unit (OBU) also situated in the vehicle, storing at least one key for at least one of data encryption, data decryption or data signing, encrypting the vehicular data received from the VCA and the ITS data received from the OBU utilizing the at least one key and storing the encrypted vehicular and ITS data.

Example 20 may include the elements of example 19, and further comprises interacting with at least one of a road side unit (RSU) in the ITS or another vehicle, the interaction including at least one of receiving messages from, or transmitting messages to, the at least one of the RSU or other vehicle.

Example 21 may include the elements of example 20, wherein the ITS data comprises at least any messages received from the at least one of the RSU or other vehicle and any transmitted messages transmitted to the at least one of the RSU or other vehicle.

Example 22 may include the elements of any of examples 20 to 21, wherein the OBU interacts with the at least one of the RSU or other vehicle on at least two channels, at least one of the at least two channels being reserved for high priority messages.

Example 23 may include the elements of example 22, and further comprises processing messages received or transmitted via the high priority message channel before other messages pending for processing in the OBU.

Example 24 may include the elements of example 19, wherein at least the encrypted ITS data is received via a secure communication channel established between the device and the OBU.

Example 25 may include the elements of example 19, and further comprises determining whether to perform data maintenance prior to storing the encrypted vehicular and ITS data and performing data maintenance including at least one of archiving or deleting old vehicular and ITS data based on the determination of whether to perform data maintenance.

Example 26 may include the elements of example 19, and further comprises receiving a request for the encrypted vehicular and ITS data from a requesting party, authenticating the requesting party based at least on one root of trust, determining at least part of the encrypted vehicular and ITS data to which the requesting party is allowed based at least on at least one policy associated with the authenticated requesting party, decrypting the at least part of the encrypted vehicular and ITS data using the at least one key, signing the at least part of the decrypted vehicular data and decrypted ITS data using the at least one key and providing the signed part of the vehicular and ITS data to the requesting party.

According to example 27 there is provided a system including at least a device, the system being arranged to perform the method of any of the above examples 19 to 26.

According to example 28 there is provided a chipset arranged to perform the method of any of the above examples 19 to 26.

According to example 29 there is provided at least one machine readable medium comprising a plurality of instructions that, in response to be being executed on a computing device, cause the computing device to carry out the method according to any of the above examples 19 to 26.

According to example 30 there is provided a device configured for data prioritization, storage and protection in a vehicular communication system, the device being arranged to perform the method of any of the above examples 19 to 26.

According to example 31 there is provided a system for protecting data in a vehicular communication system. The system may comprise means for receiving vehicular data in a device from a vehicular control architecture in a vehicle in which the device is situated, means for receiving intelligent transportation system data from an on-board unit also situated in the vehicle, means for storing at least one key for at least one of data encryption, data decryption or data signing, means for encrypting at least one of the vehicular data received from the vehicular control architecture or the intelligent transportation system data received from the on-board unit utilizing the at least one key and storing the encrypted vehicular data and encrypted intelligent transportation system data.

Example 32 may include the elements of example 31, and further comprises means for interacting with at least one of a road side unit road side unit in the intelligent transportation system or another vehicle, the interaction including at least one of receiving messages from, or transmitting messages to, the at least one of the road side unit or other vehicle.

Example 33 may include the elements of example 32, wherein the intelligent transportation system data comprises at least any messages received from the at least one of the road side unit or other vehicle and any transmitted messages transmitted to the at least one of the road side unit or other vehicle.

Example 34 may include the elements of any of examples 32 to 33, wherein the on-board unit interacts with the at least one of the road side unit or other vehicle on at least two channels, at least one of the at least two channels being reserved for priority messages.

Example 35 may include the elements of example 34, and further comprises means for processing messages received or transmitted via the priority message channel before other messages awaiting processing in the on-board unit.

Example 36 may include the elements of example 31, wherein at least the encrypted intelligent transportation system data is received via a secure communication channel established between the device and the on-board unit.

Example 37 may include the elements of example 31, and further comprises means for determining whether to perform data maintenance prior to storing the encrypted vehicular and ITS data and means for performing data maintenance including at least one of archiving or deleting old vehicular and ITS data based on the determination of whether to perform data maintenance.

Example 38 may include the elements of example 31, and further comprises means for receiving a request for the encrypted vehicular and intelligent transportation system data from a requesting party, means for authenticating the requesting party based at least on one root of trust, means for determining at least part of the encrypted vehicular and intelligent transportation system data to which the requesting party is allowed based at least on at least one policy associated with the authenticated requesting party, means for decrypting the at least part of the encrypted vehicular and intelligent transportation system data using the at least one key, means for signing the at least part of the decrypted vehicular data and decrypted intelligent transportation system data using the at least one key and means for providing the signed part of the vehicular and intelligent transportation system data to the requesting party.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device for use in a vehicular communication system, comprising:
    a communication module to at least receive vehicular data from a vehicular control architecture (VCA) in a vehicle in which the device is situated, and to receive intelligent transportation system (ITS) data from an on-board unit (OBU) also situated in the vehicle;
    a key storage module to store at least one key for at least one of data encryption, data decryption or data signing;
    a crypto module to utilize the at least one key for at least one of data encryption, data decryption or data signing; and
    a secure storage module to store encrypted vehicular data received from the VCA and encrypted ITS data received from the OBU via the communication module, the vehicular and ITS data being encrypted by the crypto module utilizing the at least one key stored in the key storage module;
    wherein the OBU:
    is to interact with at least one of a road side unit (RSU) in the ITS or another vehicle, the interaction including at least one of receiving messages from, or transmitting messages to, the at least one of the RSU or other vehicle; and
    is to interact with the at least one of the RSU or other vehicle on at least two channels, at least one of the at least two channels being reserved for high priority messages.

2. The device of claim 1, wherein the ITS data comprises at least any messages received from the at least one of the RSU or other vehicle and any transmitted messages transmitted to the at least one of the RSU or other vehicle.

3. The device of claim 1, wherein the OBU is to process messages received or transmitted via the high priority message channel before other messages pending for processing in the OBU.

4. The device of claim 1, wherein at least the key storage module, crypto module and secure storage module are protected within a trusted execution environment (TEE) in the device.

5. The device of claim 1, wherein at least the encrypted ITS data is received via a secure communication channel established between the communication module and the OBU.

6. The device of claim 1, wherein at least the secure storage module is to receive a request for the encrypted vehicular and ITS data from a requesting party via the communication module.

7. The device of claim 6, wherein at least the crypto module is to authenticate the requesting party based at least on one root of trust in the key storage module.

8. The device of claim 7, wherein at least the secure storage module is to determine at least part of the encrypted vehicular and ITS data that the requesting party is allowed to receive based at least on at least one policy associated with the authenticated requesting party.

9. The device of claim 8, wherein at least the crypto module is to decrypt the at least part of the encrypted vehicular and ITS data using the at least one key, to sign the at least part of the decrypted vehicular and ITS data using the at least one key and to provide the signed part of the vehicular and ITS data to the requesting party.

10. A method for protecting data in a vehicular communication system, comprising:
    receiving vehicular data in a device from a vehicular control architecture (VCA) in a vehicle in which the device is situated;
    receiving intelligent transportation system (ITS) data from an on-board unit (OBU) also situated in the vehicle;
    storing at least one key for at least one of data encryption, data decryption or data signing;
    encrypting the vehicular data received from the VCA and the ITS data received from the OBU utilizing the at least one key;
    storing the encrypted vehicular and ITS data: and
    interacting with at least one of a road side unit (RSU) in the ITS or another vehicle, the interaction including at least one of receiving messages from, or transmitting messages to, the at least one of the RSU or other vehicle;
    wherein the OBU interacts with the at least one of the RSU or other vehicle on at least two channels, at least one of the at least two channels being reserved for high priority messages.

11. The method of claim 10, wherein the ITS data comprises at least any messages received from the at least one of the RSU or other vehicle and any transmitted messages transmitted to the at least one of the RSU or other vehicle.

12. The method of claim 10, further comprising:
    processing messages received or transmitted via the high priority message channel before other messages pending for processing in the OBU.

13. The method of claim 10, wherein at least the encrypted ITS data is received via a secure communication channel established between the device and the OBU.

14. The method of claim 10, further comprising:
receiving a request for the encrypted vehicular and ITS data from a requesting party;
authenticating the requesting party based at least on one root of trust;
determining at least part of the encrypted vehicular and ITS data to which the requesting party is allowed based at least on at least one policy associated with the authenticated requesting party;
decrypting the at least part of the encrypted vehicular and ITS data using the at least one key;
signing the at least part of the decrypted vehicular data and decrypted ITS data using the at least one key; and
providing the signed part of the vehicular and ITS data to the requesting party.

15. At least one non-transitory machine readable storage medium having stored thereon, individually or in combination, instructions that when executed by one or more processors result in the following operations for protecting data in a vehicular communication system comprising:
receiving vehicular data in a device from a vehicular control architecture (VCA) in a vehicle in which the device is situated;
receiving intelligent transportation system (ITS) data from an on-board unit (OBU) also situated in the vehicle;
storing at least one key for at least one of data encryption, data decryption or data signing;
encrypting at least one of the vehicular data received from the VCA or the ITS data received from the OBU utilizing the at least one key;
storing the encrypted vehicular data and encrypted ITS data; and
interacting with at least one of a road side unit (RSU) in the ITS or another vehicle, the interaction including at least one of receiving messages from, or transmitting messages to, the at least one of the RSU or other vehicle;
wherein the OBU interacts with the at least one of the RSU or other vehicle on at least two channels, at least one of the at least two channels being reserved for priority messages.

16. The medium of claim 15, wherein the ITS data comprises at least any messages received from the at least one of the RSU or other vehicle and any transmitted messages transmitted to the at least one of the RSU or other vehicle.

17. The medium of claim 15, further comprising instructions that when executed by one or more processors result in the following operations comprising:
processing messages received or transmitted via the priority message channel before other messages awaiting processing in the OBU.

18. The medium of claim 15, wherein at least the encrypted ITS data is received via a secure communication channel established between the device and the OBU.

19. The medium of claim 15, further comprising instructions that when executed by one or more processors result in the following operations comprising:
receiving a request for the encrypted vehicular and ITS data from a requesting party;
authenticating the requesting party based at least on one root of trust;
determining at least part of the encrypted vehicular and ITS data to which the requesting party is allowed based at least on at least one policy associated with the authenticated requesting party;
decrypting the at least part of the encrypted vehicular and ITS data using the at least one key;
signing the at least part of the decrypted vehicular data and decrypted ITS data using the at least one key; and
providing the signed part of the vehicular and ITS data to the requesting party.

* * * * *